(12) United States Patent
Frank

(10) Patent No.: US 7,274,298 B2
(45) Date of Patent: Sep. 25, 2007

(54) INTELLIGENT INTERACTIVE BABY CALMER USING MODERN PHONE TECHNOLOGY

(75) Inventor: Wolfgang Frank, San Diego, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 362 days.

(21) Appl. No.: 10/951,508

(22) Filed: Sep. 27, 2004

(65) Prior Publication Data

US 2006/0071784 A1 Apr. 6, 2006

(51) Int. Cl.
*G08B 23/00* (2006.01)

(52) U.S. Cl. .............. 340/573.1; 340/539.1; 455/411

(58) Field of Classification Search ........ 340/539, 340/573, 1; 455/411, 528, 421
See application file for complete search history.

(56) References Cited

U.S. PATENT DOCUMENTS

| | | | |
|---|---|---|---|
| 5,684,460 A * | 11/1997 | Scanlon | ............ 340/573.1 |
| 5,991,637 A | 11/1999 | Mack, II et al. | |
| 6,043,747 A | 3/2000 | Altenhofen | |
| 6,192,257 B1 | 2/2001 | Ray | |
| 6,462,664 B1 | 10/2002 | Cuijpers et al. | |
| 6,658,091 B1 | 12/2003 | Naidoo et al. | |
| 6,744,865 B2 | 6/2004 | Lahutsky | |
| 6,757,358 B1 | 6/2004 | Kondziela | |
| 6,759,961 B2 | 7/2004 | Fitzgerald et al. | |
| 6,768,420 B2 | 7/2004 | McCarthy et al. | |
| 6,773,344 B1 | 8/2004 | Gabai et al. | |
| 2002/0057202 A1 * | 5/2002 | Luzon | ............ 340/573.1 |

* cited by examiner

Primary Examiner—Benjamin C. Lee
Assistant Examiner—Travis R. Hunnings

(57) ABSTRACT

An apparatus and methods for a wireless device to monitor a local vicinity of the wireless device is provided. The wireless device may monitor for an environmental parameter in the local vicinity of the wireless device. In response to an indication that the monitored for environmental parameter is detected, the wireless s device may provide notification of the detection.

16 Claims, 3 Drawing Sheets

INTELLIGENT INTERACTIVE BABY CALMER USING MODERN PHONE TECHNOLOGY

BACKGROUND

The present disclosure relates generally to wireless devices, and more particularly to a method and apparatus for monitoring a local vicinity to the wireless device.

Wireless devices are in widespread use. Modern wireless devices may include a number of components, functionalities, and/or technologies such as, for example, a memory, a controller, a speaker, a microphone, a graphics display, and a camera. The various components, functionalities, and technologies of the wireless device may operate to provide a device having interactive multimedia capabilities. Wireless devices that utilize the multimedia capabilities thereof provide various services and features. A continuing challenge of wireless device designers is how to effectively use the multimedia capabilities of the wireless device to address an increasing array of needs and problems of the wireless device user.

One particular challenge facing designers of wireless devices is provision of a method and apparatus that utilizes the convergence of functions and technologies of the wireless device to address problems and/or applications previously addressed by, for example, multiple, discrete devices.

One area of wireless device design in which improvement would be especially desirable relates to the monitoring of environmental parameters in a local vicinity of the wireless device. Accordingly, there exists a need to provide methods and apparatus for monitoring environmental parameters in the local vicinity of the wireless device.

SUMMARY

Apparatus and methods are therefore presented for a wireless device to monitor environmental parameters in a local vicinity of a wireless device.

According to some embodiments, a method of operating a wireless device is provided. The wireless device is operated to activate operation thereof to monitor for at least one environmental parameter in a vicinity of the wireless device. The wireless device further automatically disables a radio frequency (RF) transmitter/receiver functionality of the wireless device; detects the at least one environmental parameter being monitored; and activates, in response to the detection, operation of the wireless device to provide an action thereby. The environmental parameter being monitored may be an audible sound, a movement or motion, or a combination of the sound and the movement.

According to some embodiments, there is provided a method of activating operation of a wireless device to monitor for at least one environmental parameter in a vicinity of the wireless device; automatically disabling a radio frequency (RF) transmitter/receiver functionality of the wireless device; detecting the at least one environmental parameter; activating, in response to the detection, operation of the wireless device to provide an action by the wireless device; and operating the wireless device to provide a notification of the detection. The notification of the detection may be made by one or more methods of communication. The notification process may be accomplished by the wireless device, at least in part, by originating a call, sending a Short Message Service (SMS) message, sending a Multi-media Message Service (MMS) message, sending a electronic mail message, or a combination thereof. A user of the wireless device may selectively designate the particular method(s) of notification.

In some embodiments hereof, an apparatus is provided. The apparatus may include a wireless device such as, for example, a cellular telephone. The apparatus may include a processor; a radio frequency (RF) transmitter/receiver, operatively coupled to the processor, for receiving and transmitting information; a speaker operatively coupled to the processor; a microphone operatively coupled to the processor; and a memory operatively coupled to the processor and storing software to control the processor. The software may include executable program instructions which, when executed, control the processor to activate operation of the apparatus to monitor for at least one of a sound, motion, or combination thereof in a vicinity of the wireless device; automatically disable the functionality of the radio frequency (RF) transmitter/receiver; determine a detection of the at least one environmental parameter; and activate, in response to the determination, operation of the apparatus to provide an action thereby.

These and further aspects hereof may be more clearly understood by reference to the following detailed description, the appended claims, and to the several drawings attached herein.

BRIEF DESCRIPTION OF THE DRAWINGS

The accompanying drawings, which are incorporated in and form a part of the specification, illustrate some embodiments of the present invention, and together with the descriptions serve to explain the principles therein.

DETAILED DESCRIPTION

According to some embodiments, a wireless device provides an apparatus and methods for monitoring the local vicinity of the wireless device. For example, the wireless device may monitor for an environmental parameter such as, for example, a sound, a motion, and/or a combination thereof in the local vicinity of the wireless device. A particular sound, motion or combination thereof may be selectively monitored for detection by the wireless device. In response to an indication that the monitored for environmental parameter is detected, the wireless device may provide notification of the detection.

Some or all of these features may improve a wireless device user's ability to use the wireless device to monitor for environmental parameters.

Figure 1:
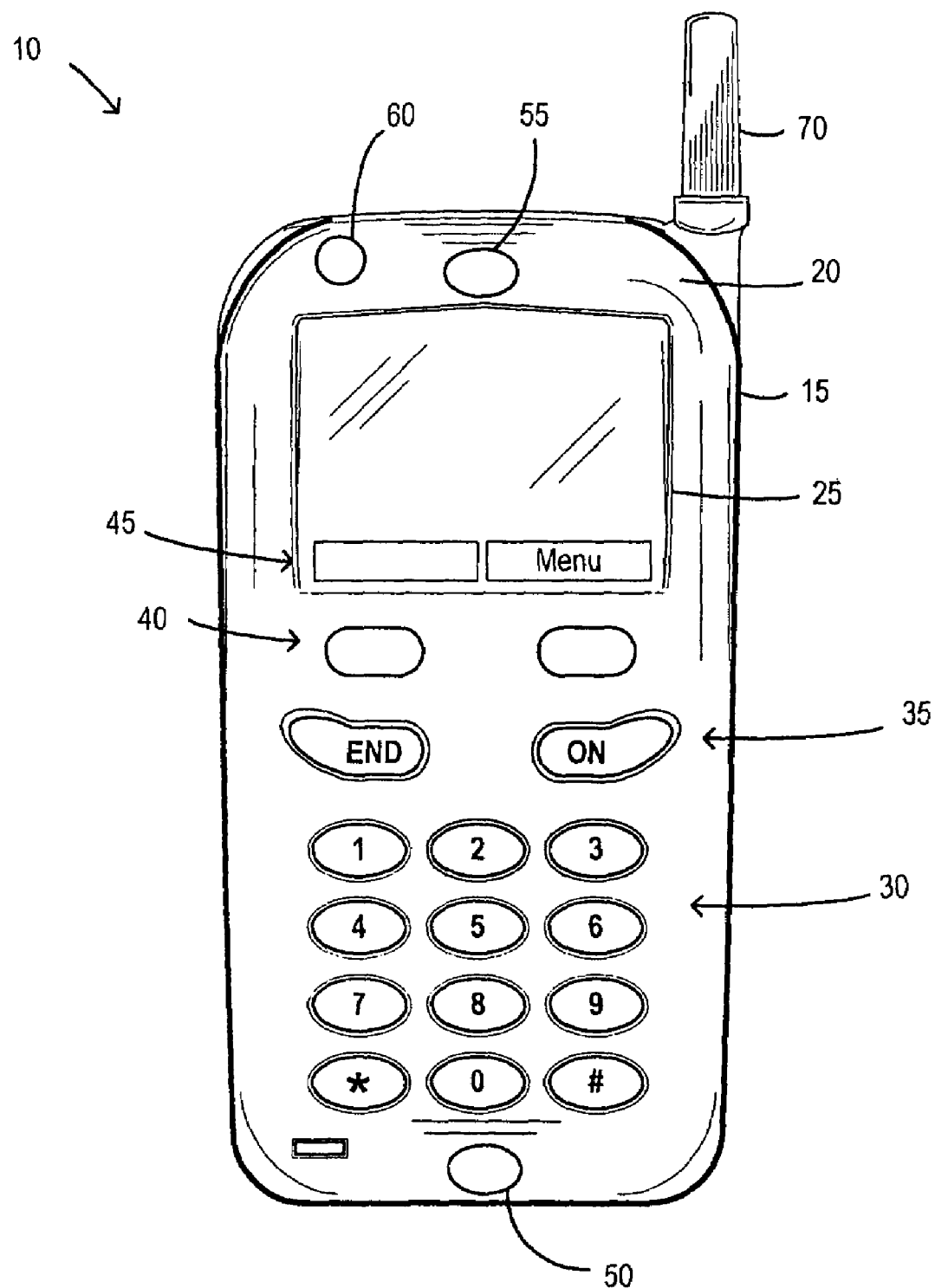
FIG. 1 is an exemplary illustration of an embodiment of an apparatus according to some embodiments hereof.

Referring to FIG. 1, there is shown an exemplary illustration of an embodiment of an apparatus, a wireless device, according to some embodiments hereof. The wireless device is generally represented by numeral 10. Wireless device 10 may include various components, functionalities, and technologies to provide a variety of features and capabilities, including multimedia capabilities. Wireless device 10 may include, as an example, a cellular telephone, a wireless telephone, a personal digital assistant (PDA), a push-to-talk (PTT) walkie talkie, a handheld personal computer (PC), a combination of these and other devices, and any other device that may include the same, like or other functionality in accordance with the present disclosure.

Wireless device 10 may be completely or largely conventional in terms of its physical components with regards to a cellular telephone. Wireless device 10 may be programmed to perform certain functions (e.g., to operate in various modes and execute various actions) in accordance with aspects of the present disclosure.

Wireless device 10 includes a housing 15, including a front housing 20, that may be shaped and sized to fit in a user's hand. Other components of wireless device 10, described in greater detail below, are mounted on, to, or within housing 15.

Wireless device 10 includes a display 25 that is mounted to front housing 20. Wireless device 10 also includes a numeric keypad 30. Keypad 30 may be mounted on, in, or through front housing 20 such that keypad 30 is accessible to the user. Wireless device 10 may include a number of certain, fixed function keys 35. Fixed function keys 35 may be associated with a predetermined function and/or feature of wireless device 10. For example, fixed function keys 35 may operate to initiate and terminate certain features and functions such as power. Functions keys 35 may be labeled, as shown, as ON and END.

Wireless device 10 may have a number of keys commonly referred to as "soft" function keys 40. Softkeys are accessible from front housing 20. A function associated with softkeys 40 will vary in accordance with a function label 45 displayed on display 25.

Front housing 20 may include a microphone 50 for receiving an audio signal and a speaker 55 for broadcasting an audio signal. Wireless device 10 may include a camera 60 for receiving a visual signal. Camera 60 may include functionality for receiving infrared (IR) signals.

Wireless device 10 may include a motion detector 65 (shown in FIG. 2) for receiving a signal indicative or representative of a motion or movement. Motion detector 65 may be included as part of another component of wireless device 10 such as, for example, camera 60.

Housing 15 may include these and/or other keys, components, and the like on front housing 20 and other portions of housing 15, including a back, a top, and sides of housing 15 which are not shown, so as to simplify the exemplary illustration of FIG. 1. Further, wireless device 10 may include keys, components, and the like (not shown for purposes related to clarity of the drawing) that are concealed from view by, for example, portions of housing 15 that are selectively moveable to conceal these other keys, components, and the like.

An antenna 70 extends from the top of housing 15. Antenna 70 is operatively coupled to a receiver/transmitter and aids in the transmission and reception of radio frequency (RF) signals transmitted and received by the receiver/transmitter. Antenna 70 may or may not be extendable to a length other than that illustrated in FIG. 1. Antenna 70 may, in some embodiments, be housed entirely within housing 15.

Figure 2:
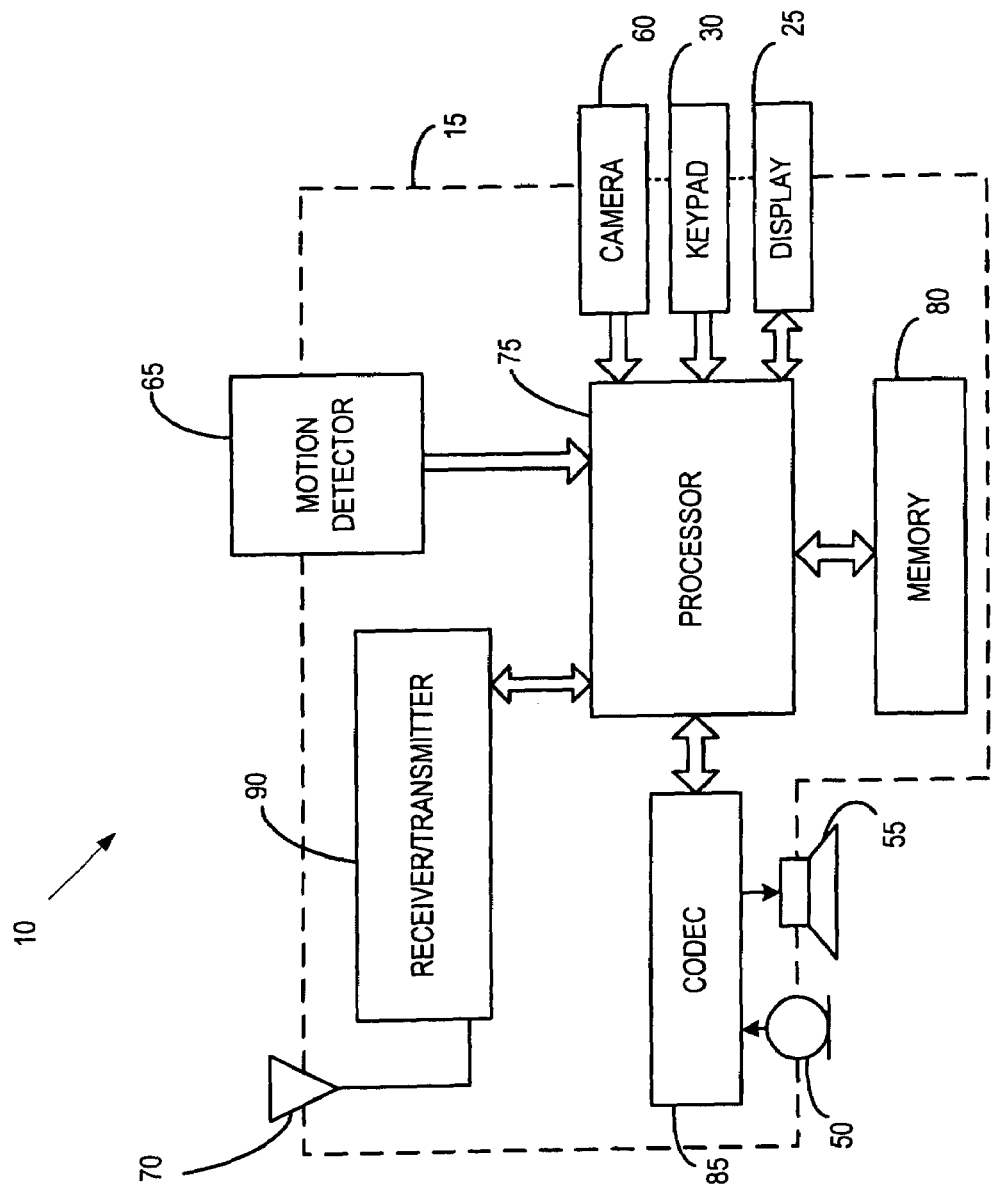
FIG. 2 is a block diagram of some potential components for the apparatus of FIG. 1 in accordance with some embodiments hereof.

FIG. 2 is an exemplary simplified block diagram of some potential components for the apparatus of FIG. 1, in accordance with some embodiments of the present disclosure.

As illustrated in FIG. 2, wireless device 10 includes a processor 75. Processor 75 may be a microprocessor, microcontroller and/or digital signal processor (DSP) or other control circuit provided in a wireless device. Also included in wireless device 10 is a memory component 80. Memory 80 may include one or more of ROM (read only memory), RAM (random access memory, e.g., static RAM, dynamic, etc.), and flash memory. Processor 75 is in data communication with memory 80. Memory 80 may store software instructions, including programs that control operation of the processor 75. Some of the software may be provided in accordance with the present disclosure to cause processor 80 to perform functions further described below.

A codec (coder/decoder) 85 may be included in wireless device 10. Codec 85 is, operatively, in data communication with the processor 75. A receiver/transmitter 90 is operatively coupled to codec 85. Receiver/transmitter 90 is operatively coupled to antenna 70. Receiver/transmitter 90 may comprise a combination of two or more different receive/transmit modules (not separately shown) that operate in accordance with mutually different radio communication protocols to provide various services for wireless device 10. For example, receiver/transmitter 90 may operate in accordance with one radio communication protocol to provide conventional cellular two-way service for wireless device 10, and may operate in accordance with another radio communication protocol to provide PTT service for wireless device 10.

Microphone 50 is operatively coupled to codec 85 to provide audio (e.g., voice) input signals to codec 85. A speaker 55 is operatively coupled to codec 85. Speaker 55 is driven by codec 85 to provide audible output therefrom.

Keypad 30 and camera 60 are operatively coupled to processor 75. Display 25 is operatively coupled to processor 75 to provide a display area for graphical output. The graphical output may include text and video (e.g., still and motion) stored in memory 80 or received by receiver/transmitter 90 (e.g., streaming video). Display 25 may form, in part, a graphical user interface of wireless device 10. In some embodiments hereof, display 25 may include a touch screen to receive input from a user of wireless device 10.

It should be understood that the block diagram representation of wireless device 10 shown in FIG. 2 is simplified in a number of ways. For example, all power, and power management components of wireless device 10 are omitted from the drawing.

Figure 3:
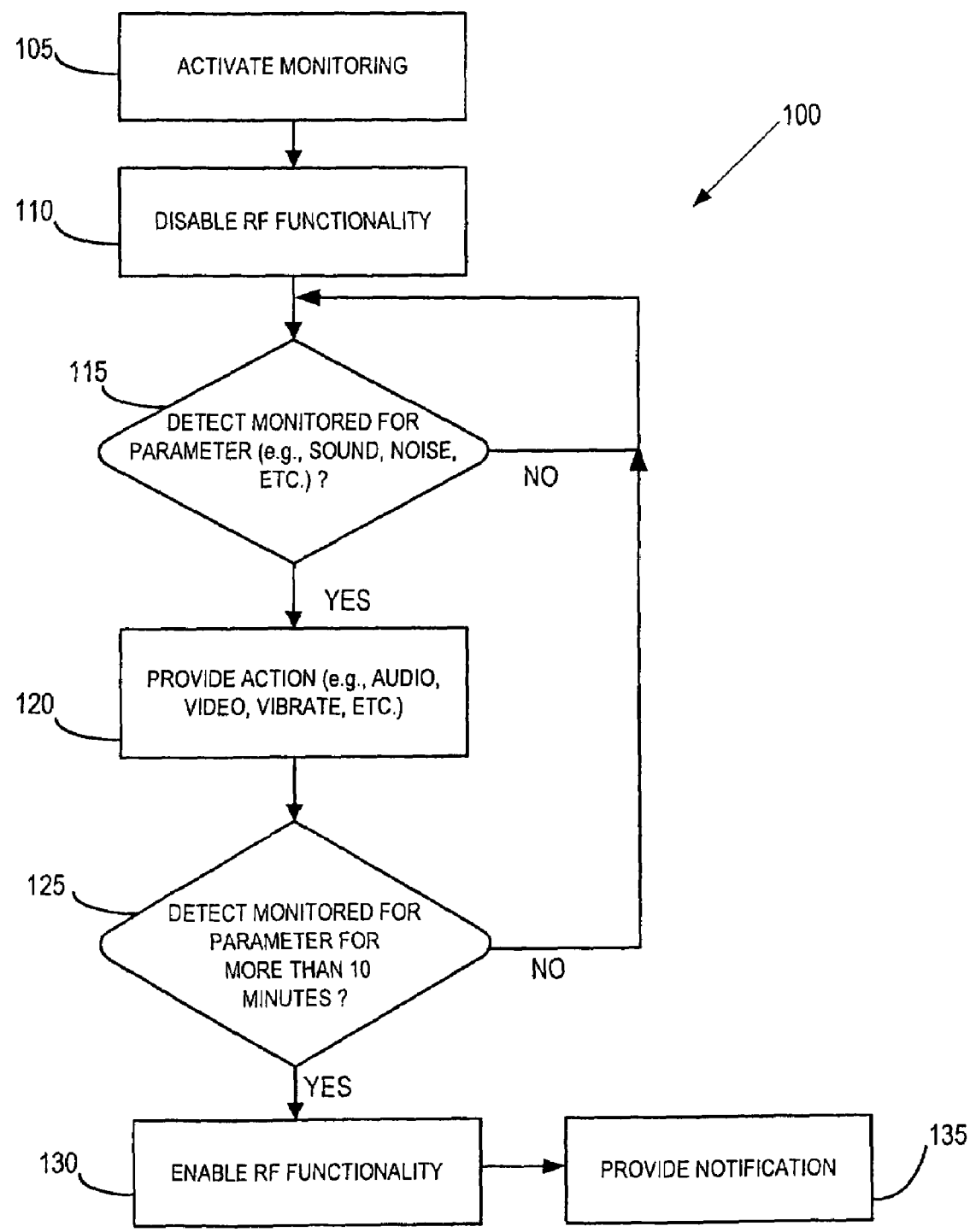
FIG. 3 is an exemplary flowchart of an embodiment of a method in accordance with some embodiments hereof.

FIG. 3 is an exemplary flow chart that illustrates a process 100 performed by wireless device 10 in accordance with some aspects of the present disclosure. Process 100 relates to monitoring a local vicinity of wireless device 10 via the wireless device 10. The function of monitoring may represent one of a number of functions and/or modes of operation provided by wireless device 10. Process 100 may be implemented by a software program stored in one or more of memory 80 to control processor 75.

As indicated at 105, wireless device 10 is activated to begin monitoring the local vicinity of the wireless device. The wireless device monitors the local vicinity thereof for at least one environmental parameter. Activation of the wireless device for monitoring may be effectuated by pressing a keypad 30 key or a softkey 40. In some embodiments, a single keypress may be used to activate monitoring by wireless device 10. In other embodiments, a combination of keypresses may be used to activate the monitoring.

The environmental parameter that is monitored for detection may be any parameter that can be monitored by wireless device 10 and components thereof. For example, an audible sound may be monitored by wireless device using, for example, microphone 50 and a movement or motion may be monitored for by using camera 60 and/or motion detector 65. Processor 75 and software (e.g., in memory 80) may be used to determine (i.e., detect) whether signals received by the microphone, camera, and motion detector are likely representations of the environmental parameter being monitored for. For example, wireless device 10 may be used to monitor the activity of a baby or sick person. In particular, it may be desired to monitor whether the baby or sick person is upset (e.g., crying or whining) or in pain (e.g., moaning, thrashing about) or otherwise in need of attention (e.g., having a seizure).

In some embodiments, the environmental parameter is monitored (i.e., actively monitored) at specific intervals of time for a specific period of time. The interval between periods of monitoring and the length of the monitoring may be predetermined or adjusted depending on the parameter being monitored, a user's personal preferences, the outcome of prior monitoring periods, or a combination of these and other factors. For example, the interval between periods of actively monitoring may be decreased if during a most recent prior period of monitoring crying was detected or increased if the battery powering wireless device 10 is running low.

In an aspect hereof, as shown at 110, a RF functionality of wireless device 10 is disabled. Disabling the RF functionality of wireless device 10 may be accomplished by software that turns off receiver/transmitter 90. Disabling the RF functionality prevents the transmission and reception of RF signals. Accordingly, a call cannot be received or originated by wireless device 10 when the RF functionality is disabled. For example, the environment being monitored by the wireless device can be unobtrusively monitored since a call cannot be accidentally originated by wireless device 10 or received by the wireless device when the RF functionality is disabled.

In some embodiments, the RF functionality is automatically disabled in response to or concomitant with the activation of the wireless device for monitoring.

At 115, a determination is made whether the monitored for parameter is detected by wireless device 10. For example, in the instance wireless device 10 is located near a sleeping baby to monitor whether the baby is crying, microphone 50 and processor 75 are activated to "listen" for audible sounds indicative a human crying.

In the instance that the determination made at 115 is that the monitored for parameter is not detected, then process 100 reverts back to continuing to monitor. In some embodiments, the time of actively monitoring for the environmental parameter 115 is repeated at predetermined intervals, such as every 2 minutes for a period of 10 seconds.

In the instance a determination is made at 115 that the monitored for parameter is detected (e.g., baby crying), process 100 proceeds to 120. At 120, wireless device 10 provides an action. In some embodiments, wireless device 10 automatically provides the action in response to detection of the environmental parameter at 115. The action may include, for example, a sound from speaker 55 (e.g., music, tones in a random or predetermined order), a display of graphics on display 25, other action(s) such as a vibration of wireless device 10 by a vibration device (not shown) included therein, or a combination of these and other actions. The displayed graphics may include still photographs (e.g., a photograph of the baby's mother), random graphics, and video (e.g., an animated cartoon).

In some embodiments, the action provided by wireless device 10 at 120 may be a combination of playing a lullaby from speaker 55 and the simultaneous displaying of a photograph(s) of the baby's parents on display 25.

At 125, a determination is made whether the monitored for environmental parameter (e.g., movement, crying, etc.) is detected for more than a predetermined period of time. In some embodiments, the period of time may be fixed or adjusted depending on the parameter being monitored, a user's personal preferences, the outcome of prior monitoring periods, or a combination of these and other factors. For example, a determination may be made at 125 whether crying detected at 115 has continued for ten or more minutes.

In the instance a determination is made at 125 that the monitored for parameter is detected less than, for example, 10 minutes, then process 100 reverts back to continuing to monitor. In the instance a determination is made at 125 that the monitored for parameter is detected for at least ten minutes, then process 100 proceeds to 130.

At 130, the RF functionality of wireless device 10 is activated. Activation of the RF functionality of wireless device 10 provides the capability of receiving and transmitting RF signals. That is, with the RF functionality enabled, wireless device 10 can originate and receive RF based communications.

In some embodiments, the RF functionality is enabled at 130 to facilitate a notification process at 135. The notification process is provided in response to the determination at 125 that the monitored for environmental parameter was detected for more than the predetermined period. The notification process may include providing a notification or alert that the monitored for environmental parameter was detected for more than the predetermined period of time. For example, the notification may be provided by originating a call to a predetermined telephone number, sending a Short Message Service (SMS) message, sending a Multimedia Message Service Message (MMS), sending an electronic mail message, other methods and forms of communication, and any combination thereof. The notification can be provided to a telephone, a PDA, a PC (e.g., handheld or desktop), other communication devices, a printer, a display, and other such devices.

In some embodiments, more than one mode or method of notification may be provided by wireless device 10. The particular methods of notification and the order in which they occur can be selectively determined by the user.

Upon notification, the notified person may talk to the baby (or other person at the location with the wireless device) through speaker 55, listen to the local vicinity of wireless device 10, and activate wireless device 10 to initiate and/or terminate certain actions. Upon notification, a parent may watch the baby via the wireless device's camera 60, sing to the crying baby through speaker 55 in an attempt to quiet the baby from a distant location, activate the wireless device to show a specific graphic (e.g., a favorite cartoon) on display 25, and/or vibrate wireless device 10 to soothe the baby, or stop any of these and other actions previously activated by the wireless device.

In some embodiments, wireless device 10 may be enabled to control another device (not shown) via, for example infrared (IR) signals. Thus, the notification of 135 may be implemented by wireless device 10 controlling another device to provide an indication that the monitored for environmental parameter has been detected for the requisite time.

The apparatus and methods disclosed herein may be used to monitor for a variety of environmental parameters in a variety of contexts. For example, the apparatus and methods hereof may be used to provide surveillance of a residence or business.

In some embodiments of the present disclosure, the functionality of wireless device is largely disabled when the wireless device is operated to monitor for environmental parameters. This may be done to prevent the accidental or otherwise undesired activating and functioning of wireless device 10 by, for example, a baby, sick person, or an intruder.

Accordingly, the apparatus and methods hereof may be used to capitalize on the convergence of technologies and functions in a wireless device to provide monitoring of the local vicinity of the wireless device. In this manner, the range for monitoring can be increased by using a wireless device that communicates, for example, over a cellular telephone network using the communication protocol(s) thereof. Additionally, the functionality of the wireless device may be expanded to include monitoring. The monitoring thus provided by the wireless device will enjoy the benefits of the communication protocol(s) used thereby such as, for example, a stable, reliable, and robust communication medium.

While the apparatus and methods of the present disclosure have been described in detail in the foregoing embodiments, it is to be understood that the descriptions have been provided for purposes of illustration only and that other variations, both in form and detail, can be made thereupon by those skilled in the art without departing from the spirit and scope of the invention, which is defined solely by the appended claims.

What is claimed is:

1. A method of operating a wireless device, comprising:
   activating operation of the wireless device to monitor for at least one environmental parameter in a vicinity of the wireless device;
   automatically disabling a radio frequency (RF) transmitter/receiver functionality of the wireless device;
   detecting the at least one environmental parameter after the disabling; and
   activating, in response to the detection, operation of the wireless device to provide an action by the wireless device;
   wherein the action provided is at least one of providing: a sound through a speaker of the wireless device, a graphical presentation on a display of the wireless device, a vibration of the wireless device, or a combination thereof.

2. A method according to claim 1, wherein the at least one environmental parameter is at least one of a sound, a movement, or a combination of the sound and the movement.

3. A method according to claim 1, wherein the disabling is in response to or concomitant with the activating operation of the wireless device to monitor.

4. A method of claim 1, further comprising operation of the wireless device to provide notification of the detection.

5. A method of claim 4, wherein the notification is provided by at least one of: originating a call, sending a Short Message Service (SMS) message, sending a Multimedia Message Service (MMS) message, sending a electronic mail message, or a combination thereof.

6. A method according to claim 1, wherein the monitoring occurs at a predetermined interval of time for a predetermined period of time.

7. A method of operating a wireless device, comprising:
   activating operation of the wireless device to monitor for at least one environmental parameter in a vicinity of the wireless device;
   automatically disabling a radio frequency (RF) transmitter/receiver functionality of the wireless device;
   detecting the at least one environmental parameter after the disabling;
   activating, in response to the detection, operation of the wireless device to provide an action by the wireless device; and
   operating the wireless device to provide a notification of the detection;
   wherein the action provided is at least one of providing: a sound through a sneaker of the wireless device, a graphical presentation on a display of the wireless device, a vibration of the wireless device, or a combination thereof.

8. A method according to claim 7, wherein the at least one environmental parameter is at least one of a sound, a movement, or a combination of the sound and the movement.

9. A method according to claim 7, wherein the disabling is in response to or concomitant with the activating operation of the wireless device to monitor.

10. A method of claim 7, wherein the notification is provided by at least one of: originating a call, sending a Short Message Service (SMS) message, sending a Multimedia Message Service (MMS) message, sending a electronic mail message, ore combination thereof.

11. A method of claim 7, further comprising enabling operation of the radio frequency (RF) transmitter/receiver functionality of the wireless device to facilitate the notification.

12. A wireless device comprising:
    a processor;
    a radio frequency (RF) transmitter/receiver, operatively coupled to the processor, for receiving and transmitting information;
    a speaker operatively coupled to the processor;
    a microphone operatively coupled to the processor; and
    a memory operatively coupled to the processor and storing software to control the processor to:
    activate operation of the wireless device to monitor for at least one environmental parameter in a vicinity of the wireless device, said environmental parameter being monitored by said microphone;
    automatically disable the functionality of the radio frequency (RF) transmitter/receiver in response to the activate operation;
    determine a detection of the at least one environmental parameter after the disabling; and
    activate, in response to the determination, operation of the wireless device to provide an action by the wireless device.

13. A wireless device telephone according to claim 12, further comprising a vibration device that, as part of the action provided by the wireless device, operates to vibrate the wireless device.

14. A wireless device according to claim 12, further comprising a softkey selectively associated with an initiation of the activation operation of the wireless device to monitor.

15. A wireless device according to claim 12, wherein the memory further comprises software to control the processor to operate the wireless device to provide notification of the detection remotely from the wireless device.

16. A wireless device according to claim 15, wherein the notification is provided by at least one of: originating a call, sending a Short Message Service (SMS) message, sending a Multimedia Message Service (MMS) message, sending a electronic mail message, or a combination thereof.

* * * * *